US012449002B2

United States Patent
Taniguchi

(10) Patent No.: US 12,449,002 B2
(45) Date of Patent: Oct. 21, 2025

(54) TAPERED ROLLER BEARING

(71) Applicant: JTEKT CORPORATION, Kariya (JP)

(72) Inventor: Youzou Taniguchi, Kashihara (JP)

(73) Assignee: JTEKT CORPORATION, Kariya (JP)

( * ) Notice: Subject to any disclaimer, the term of this patent is extended or adjusted under 35 U.S.C. 154(b) by 12 days.

(21) Appl. No.: 18/712,641

(22) PCT Filed: Dec. 14, 2021

(86) PCT No.: PCT/JP2021/046001
§ 371 (c)(1),
(2) Date: May 22, 2024

(87) PCT Pub. No.: WO2023/112135
PCT Pub. Date: Jun. 22, 2023

(65) Prior Publication Data
US 2025/0020168 A1   Jan. 16, 2025

(51) Int. Cl.
*F16C 33/36* (2006.01)
*F16C 19/36* (2006.01)
*F16C 33/46* (2006.01)
*F16C 33/58* (2006.01)

(52) U.S. Cl.
CPC ......... *F16C 33/585* (2013.01); *F16C 19/364* (2013.01); *F16C 33/366* (2013.01); *F16C 33/4605* (2013.01); *F16C 33/4617* (2013.01); *F16C 33/4676* (2013.01)

(58) Field of Classification Search
CPC .. F16C 19/364; F16C 33/366; F16C 33/4605; F16C 33/4617; F16C 33/4623; F16C 33/4629; F16C 33/4635; F16C 33/4676; F16C 33/4682; F16C 33/585
See application file for complete search history.

(56) References Cited

U.S. PATENT DOCUMENTS

| 2016/0265587 A1* | 9/2016 | Kamamoto .............. F16C 3/02 |
| 2017/0298989 A1 | 10/2017 | Kamamoto et al. |
| 2018/0003228 A1* | 1/2018 | Kamamoto ......... F16C 33/4617 |
| 2018/0003229 A1 | 1/2018 | Murata et al. |
| 2020/0378437 A1 | 12/2020 | Matsubuchi et al. |

FOREIGN PATENT DOCUMENTS

| DE | 102017100124 A1 * | 7/2017 | ........... F16C 19/364 |
| JP | 2010-071321 A | 4/2010 | |
| JP | 2016-089845 A | 5/2016 | |
| JP | 2018-003942 A | 1/2018 | |
| JP | 2022086292 A * | 6/2022 | |
| WO | 2019/163809 A1 | 8/2019 | |

OTHER PUBLICATIONS

Feb. 8, 2022 International Search Report issued in International Patent Application No. PCT/JP2021/046001.

* cited by examiner

*Primary Examiner* — Phillip A Johnson
(74) *Attorney, Agent, or Firm* — Oliff PLC

(57) ABSTRACT

A recess is provided in the large-diameter annular portion of a cage of a tapered roller bearing. A first clearance between the large-diameter annular portion and the outer ring is smaller than a second clearance between the small-diameter annular portion and the outer ring. The large-diameter annular portion includes, in its outer periphery, a tilted surface whose diameter increases toward the other side in an axial direction. The tilted surface faces an inner peripheral surface of the outer ring.

4 Claims, 5 Drawing Sheets

TAPERED ROLLER BEARING

TECHNICAL FIELD

The present disclosure relates to tapered roller bearings.

BACKGROUND ART

A tapered roller bearing includes an outer ring, an inner ring, a plurality of tapered rollers, and an annular cage that holds the plurality of tapered rollers. Each tapered roller has a small end face on one side in an axial direction and a large end face on the other side in the axial direction. The inner ring has a large rib that slidingly contacts the large end faces of the tapered rollers (see, for example, Patent Document 1).

RELATED ART DOCUMENTS

Patent Documents

Patent Document 1: Japanese Unexamined Patent Application Publication No. 2018-3942 (JP 2018-3942 A)

SUMMARY OF THE INVENTION

Problem to be Solved by the Invention

In a tapered roller bearing, when an inner ring rotates, large end faces of tapered rollers slidingly contact a large rib of the inner ring. When the bearing has just started to rotate and there still is not enough lubricating oil between the tapered rollers and the large rib, or when the bearing is rotating but is poorly lubricated due to not enough lubricating oil being supplied thereto, seizure tends to occur between the tapered rollers and the large rib.

In the tapered roller bearing disclosed in Patent Document 1, the clearances between each of the outer ring and the inner ring and a large-diameter annular portion of the cage are small. Therefore, lubricating oil inside the bearing where the tapered rollers are located is less likely to flow out of the bearing, so that seizure between the tapered rollers and the large rib can be prevented using this lubricating oil.

As described above, in tapered roller bearings, it is necessary to prevent seizure between the tapered rollers and the large rib of the inner ring, and it has been desired to develop a new technical means that can improve a function to prevent the seizure.

Means for Solving the Problem

A tapered roller bearing of the present disclosure includes: an outer ring including an outer ring raceway surface whose diameter increases from one side in an axial direction toward another side in the axial direction; an inner ring including an inner ring raceway surface whose diameter increases from the one side in the axial direction toward the other side in the axial direction; a plurality of tapered rollers each including a large end face on the other side in the axial direction; and an annular cage that holds the plurality of tapered rollers. The cage includes a small-diameter annular portion located on the one side in the axial direction of the tapered rollers, a large-diameter annular portion located on the other side in the axial direction of the tapered rollers, and a plurality of bars connecting the small-diameter annular portion and the large-diameter annular portion. The inner ring includes a large rib that slidingly contacts the large end faces. A recess that is open toward the large end faces is provided in the large-diameter annular portion. A first clearance between the large-diameter annular portion and the outer ring is smaller than a second clearance between the small-diameter annular portion and the outer ring. The large-diameter annular portion includes, in an outer periphery of the large-diameter annular portion, a tilted surface whose diameter increases toward the other side in the axial direction. The tilted surface includes an opposing surface portion that is located on the one side in the axial direction with respect to an imaginary plane extending along a side surface on the other side in the axial direction of the outer ring, and that faces an inner peripheral surface of the outer ring.

Effects of the Invention

According to the tapered roller bearing of the present disclosure, it is possible to improve the function to prevent seizure between the large rib of the inner ring and the large end faces of the tapered rollers.

MODES FOR CARRYING OUT THE INVENTION

Figure 1:
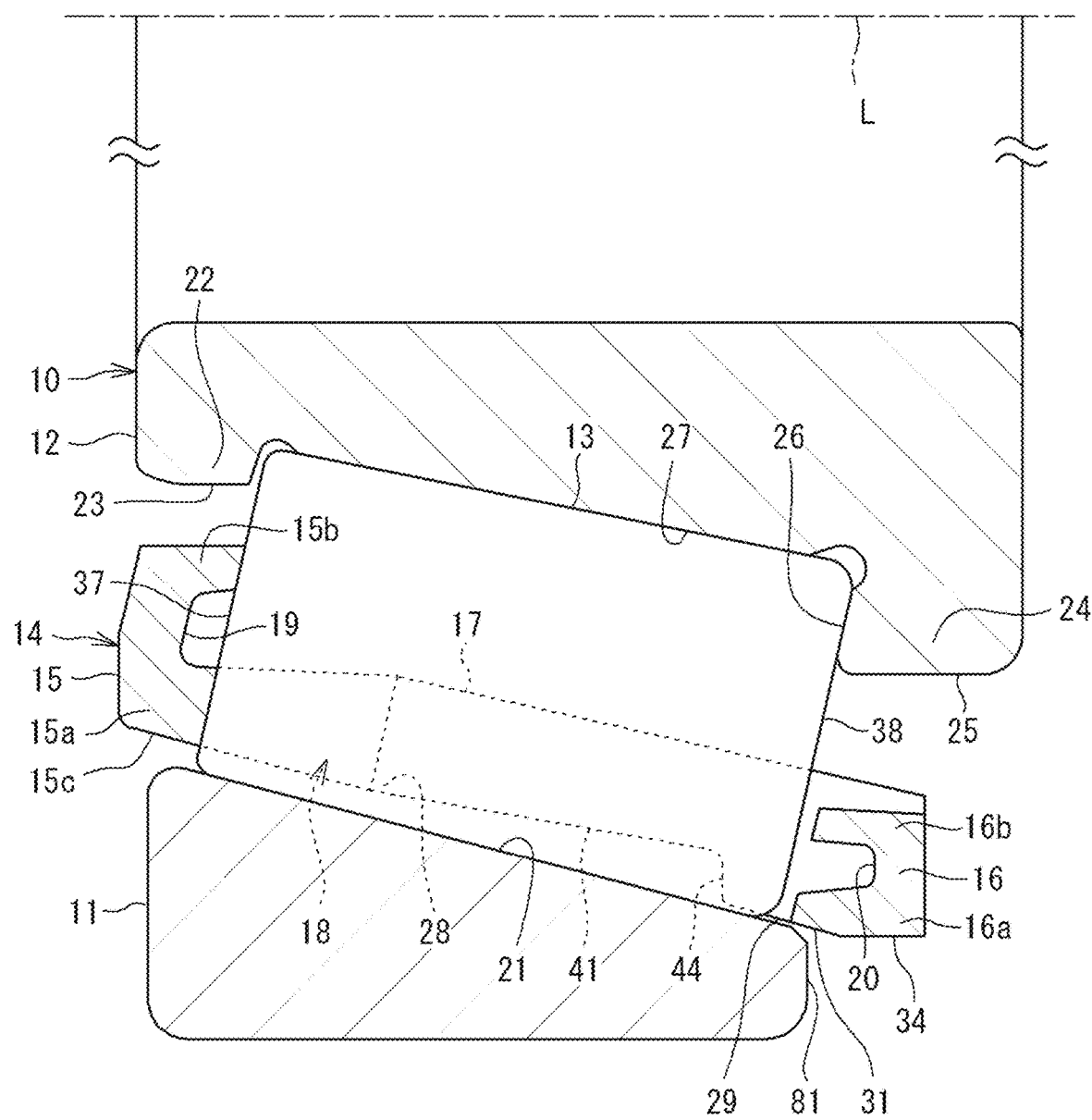
FIG. 1 is a sectional view showing an example of a tapered roller bearing.

Overview of Embodiment of Invention of Present Disclosure

An overview of an embodiment of the invention of the present disclosure will be provided below.

(1) A tapered roller bearing of the present disclosure includes: an outer ring including an outer ring raceway surface whose diameter increases from one side in an axial direction toward another side in the axial direction; an inner ring including an inner ring raceway surface whose diameter increases from the one side in the axial direction toward the other side in the axial direction; a plurality of tapered rollers each including a large end face on the other side in the axial direction; and an annular cage that holds the plurality of tapered rollers. The cage includes a small-diameter annular portion located on the one side in the axial direction of the tapered rollers, a large-diameter annular portion located on the other side in the axial direction of the tapered rollers, and a plurality of bars connecting the small-diameter annular portion and the large-diameter annular portion. The inner ring includes a large rib that slidingly contacts the large end faces. A recess that is open toward the large end faces is provided in the large-diameter annular portion. A first clearance between the large-diameter annular portion and the outer ring is smaller than a second clearance between the small-diameter annular portion and the outer ring. The large-diameter annular portion includes, in an outer periphery of the large-diameter annular portion, a tilted surface whose diameter increases toward the other side in the axial direction. The tilted surface includes an opposing surface portion that is located on the one side in the axial direction with respect to an imaginary plane extending along a side surface on the other side in the axial direction of the outer ring, and that faces an inner peripheral surface of the outer ring.

According to the above tapered roller bearing, the first clearance between the outer ring and the large-diameter annular portion of the cage is small. The large-diameter annular portion has the tilted surface whose diameter increases toward the other side in the axial direction like the outer ring raceway surface, and the tilted surface has the opposing surface portion that faces the outer ring. Therefore, lubricating oil is less likely to flow out from between the inner peripheral surface of the outer ring and the opposing surface portion of the large-diameter annular portion. The lubricating oil is stored in the recess of the large-diameter annular portion. Since the first clearance is small, an outer peripheral surface of the large-diameter annular portion is located close to the outer ring. Therefore, the large-diameter annular portion is increased in size in a radial direction, so that the capacity of the recess can be increased. The lubricating oil on the other side in the axial direction is thus easily supplied between the large rib of the inner ring and the large end faces of the tapered rollers, which can improve the function to prevent seizure therebetween.

(2) When the tapered roller bearing rotates, lubricating oil flows from the one side in the axial direction to the other side in the axial direction. Therefore, in the tapered roller bearing, a sum of the first clearance and a third clearance is preferably larger than a sum of the second clearance and a fourth clearance, the third clearance being a clearance between the large-diameter annular portion and an outer peripheral surface of the large rib, and the fourth clearance being a clearance between the small-diameter annular portion and the inner ring.

As described above, the first clearance is smaller than the second clearance. However, according to the configuration, the total of the first clearance and the third clearance is larger than the total of the second clearance and the fourth clearance. In other words, the clearance on the downstream side in a flow direction of the lubricating oil is larger than the clearance on the upstream side. Therefore, when the bearing is rotating, the lubricating oil is less likely to stagnate inside the bearing, so that stirring resistance of the lubricating oil caused by the rotating cage can be reduced.

(3) Preferably, the bar includes, on a radially outer side of the bar, an outer surface that increases a distance to the inner peripheral surface of the outer ring toward the other side in the axial direction.

In this case, when the centerline of the tapered roller bearing is horizontal, a larger space for storing the lubricating oil can be secured between the bars and the outer ring on the bottom side of the tapered roller bearing when the bearing is stopped. When the bearing starts rotating, the lubricating oil in that space can be used for lubrication.

(4) In the tapered roller bearing of (3), more preferably, the bar includes a wall surface extending from an end on the other side in the axial direction of the outer surface toward the outer ring, and the wall surface is provided on the one side in the axial direction with respect to the large-diameter annular portion.

In this case, when the bearing rotates, the lubricating oil flowing toward the other side in the axial direction along the outer surface of the cage hits the wall surface. The flow direction of the lubricating oil thus changes to a circumferential direction, so that the lubricating oil is easily supplied to pockets holding the tapered rollers and the large end faces of the tapered rollers.

Details of Embodiment of Invention of Present Disclosure

Hereinafter, the embodiment of the invention of the present disclosure will be described.

[Overall Configuration of Tapered Roller Bearing]

FIG. 1 is a sectional view showing an example of a tapered roller bearing. A tapered roller bearing 10 includes an outer ring 11, an inner ring 12, a plurality of tapered rollers 13, and an annular cage 14. The centerline of the outer ring 11 coincides with the centerline of the inner ring 12, and these centerlines are the centerline L of the tapered roller bearing 10. In the present embodiment, the inner ring 12 is a rotating ring that rotates with a shaft, not shown, and the outer ring 11 is a stationary ring that is attached to a housing, not shown. However, the outer ring 11 may be a rotating ring.

A direction along the centerline L and a direction parallel to the centerline L are defined as the "axial direction" of the tapered roller bearing 10. The left side in FIG. 1 is "one side in the axial direction," and the right side in FIG. 1 is the "other side in the axial direction." A direction perpendicular to the centerline L is defined as the "radial direction" of the tapered roller bearing 10. A direction along a circle about the centerline L is defined as the "circumferential direction" of the tapered roller bearing 10.

Lubrication performance of the tapered roller bearing 10 is maintained by lubricating oil (oil). When the tapered roller bearing 10 rotates, the lubricating oil inside the bearing between the outer ring 11 and the inner ring 12 where the tapered rollers 13 are located flows from the one side in the axial direction to the other side in the axial direction. Due to this flow, the lubricating oil that is present outside the bearing on the one side in the axial direction of the tapered roller bearing 10 enters the inside of the bearing, passes through the inside of the bearing, and flows out of the bearing from the other side in the axial direction. The tapered roller bearing 10 is lubricated by such lubricating oil.

Each tapered roller 13 has a small end face 37 on one side in the axial direction and a large end face 38 on the other side in the axial direction. The outer ring 11 is cylindrical and has an outer ring raceway surface 21 in its inner peripheral surface. The diameter of the outer ring raceway surface 21 increases from the one side in the axial direction toward the other side in the axial direction.

The inner ring 12 is cylindrical and has an inner ring raceway surface 27 in its outer peripheral surface. The diameter of the inner ring raceway surface 27 increases from the one side in the axial direction toward the other side in the axial direction. The inner ring 12 has a small rib 22 on the one side in the axial direction, and has a large rib 24 on the other side in the axial direction. The small rib 22 protrudes radially outward from the inner ring raceway surface 27. The large rib 24 protrudes radially inward from the inner ring raceway surface 27. An outer peripheral surface 25 of the large rib 24 is larger in diameter than an outer peripheral surface 23 of the small rib 22. The large rib 24 has a rib surface 26 that slidingly contacts the large end faces 38 of the tapered rollers 13.

The cage 14 includes a small-diameter annular portion 15 located on the one side in the axial direction of the tapered rollers 13, a large-diameter annular portion 16 located on the other side in the axial direction of the tapered rollers 13, and a plurality of bars 17 connecting the small-diameter annular portion 15 and the large-diameter annular portion 16. Each region located between two circumferentially adjacent bars 17, 17 between the small-diameter annular portion 15 and the large-diameter annular portion 16 serves as a pocket 18 that holds one tapered roller 13.

A first recess 19 that is open toward the small end faces 37 of the tapered rollers 13 is provided in the small-diameter annular portion 15. A second recess 20 that is open toward the large end faces 38 of the tapered rollers 13 is provided in the large-diameter annular portion 16. The bars 17 are provided so as to extend from a radially outer portion 15a of the small-diameter annular portion 15. A radially inner portion 15b of the small-diameter annular portion 15 is provided so as to extend in the radial direction from the radially outer portion 15a, and is not connected to the bars 17. The radially inner portion 15b is therefore relatively easily deformable. The bars 17 are connected to both a radially outer portion 16a and radially inner portion 16b of the large-diameter annular portion 16.

Figure 4:
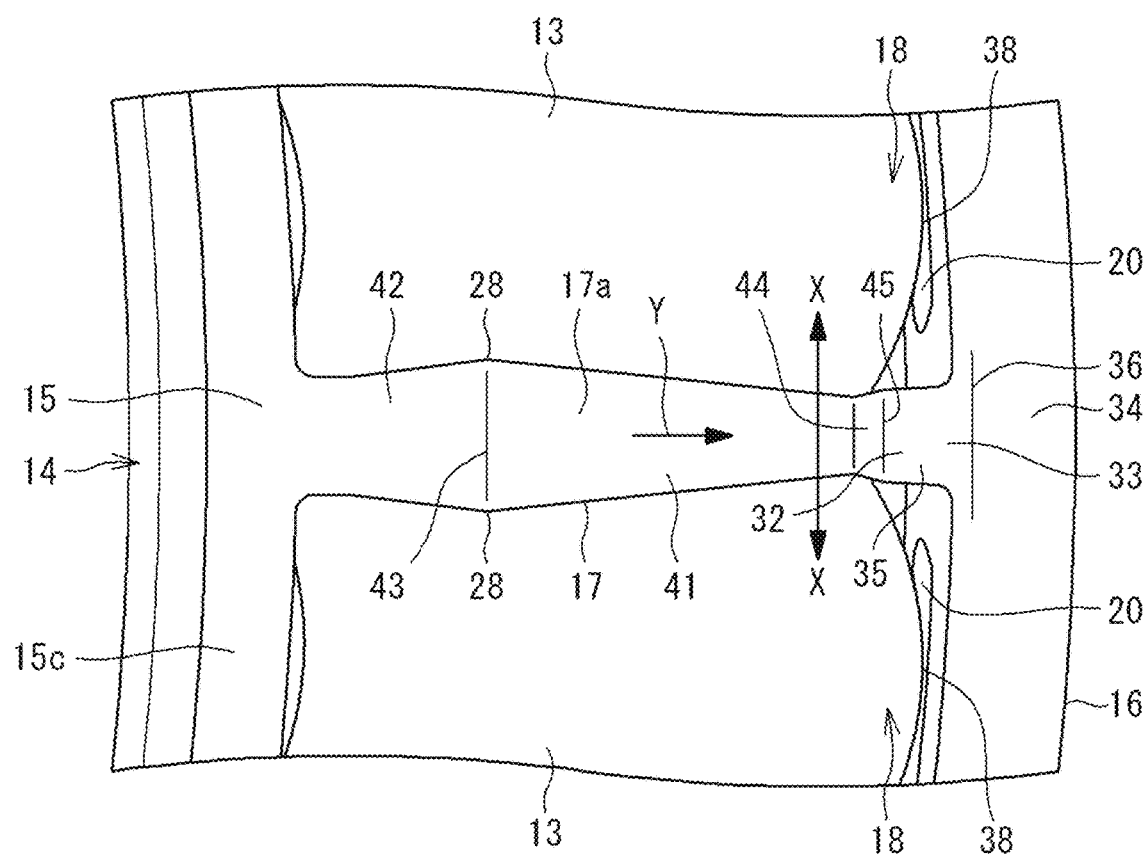
FIG. 4 is an illustration of the cage and tapered rollers with a bar in the middle, as viewed from outside in the radial direction.

A state in which the outer ring 11 is removed from the assembled state shown in FIG. 1 is defined as a disassembled state. In the disassembled state, the pockets 18 of the cage 14 hold the tapered rollers 13 so as to prevent the tapered rollers 13 from falling out radially outward. Therefore, each bar 17 has contact portions 28 that contact the tapered rollers 13 from outside in the radial direction (see FIG. 4). FIG. 4 is an illustration of the cage 14 and the tapered rollers 13 with the bar 17 in the middle, as viewed from outside in the radial direction. The contact portions 28 are provided so as to protrude on both sides in the circumferential direction from a body 17a of the bar 17.

A state in which the centerline of the cage 14 is aligned with the centerline L of the tapered roller bearing 10 as shown in FIG. 1 is defined as a "reference state." The reference state is a state in which the small end faces 37 of the tapered rollers 13 are in contact with the small-diameter annular portion 15 of the cage 14. In the reference state, there is a small clearance in the radial direction between each tapered roller 13 in contact with the inner ring raceway surface 27 and the contact portions 28 of the cage 14. The cage 14 is radially displaceable within the clearance.

The cage 14 has, in a part of its outer peripheral surface, a guide surface 29 that can contact an inner peripheral surface of the outer ring 11. The cage 14 is positioned in the radial direction by the guide surface 29 contacting the inner peripheral surface of the outer ring 11 (outer ring raceway surface 21). In other words, the cage 14 of the present embodiment is a cage guided by an outer ring. A part of the large-diameter annular portion 16 (opposing surface portion 32 described later, see FIG. 2) and a part of each bar 17 connected to that part (extended surface 35 described later, see FIG. 2) serve as the guide surface 29.

Figure 2:
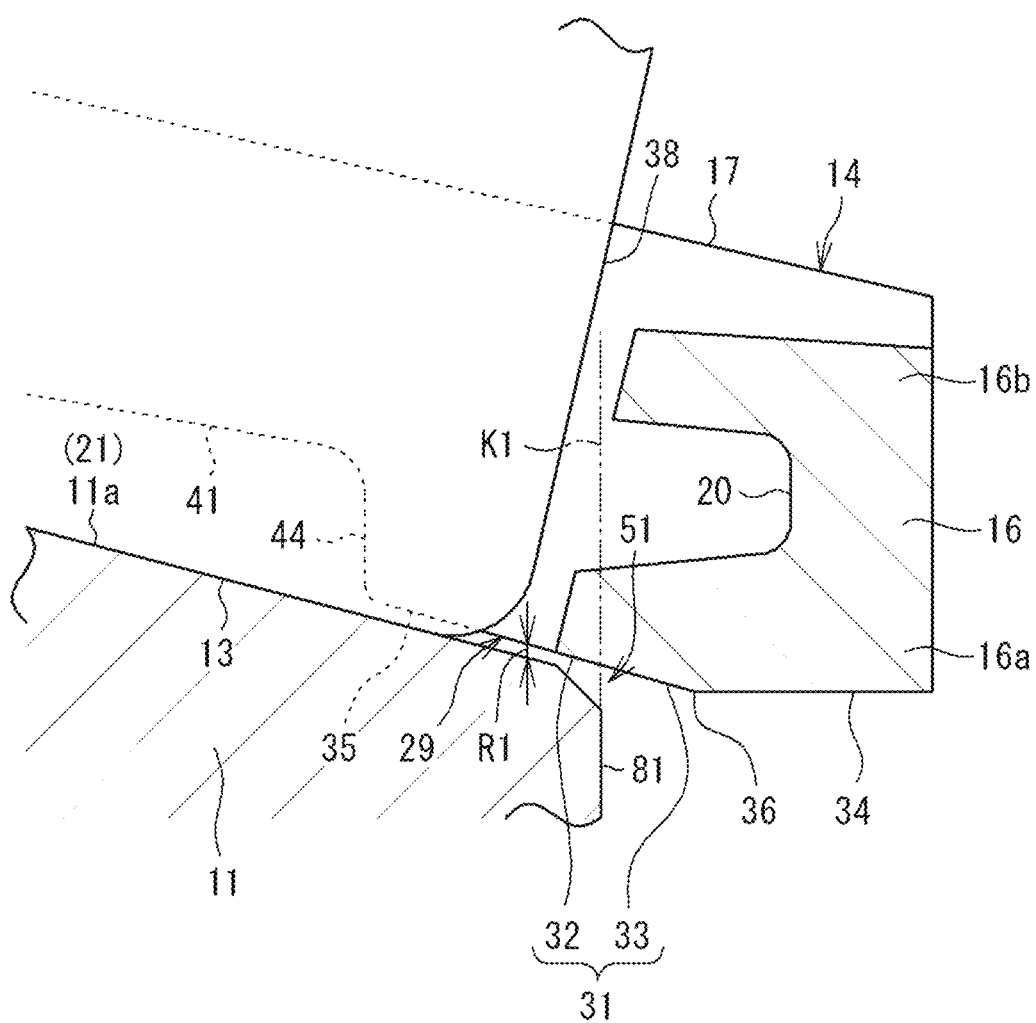
FIG. 2 is an enlarged sectional view showing a large-diameter annular portion of a cage and its surrounding area.

FIG. 2 is an enlarged sectional view showing the large-diameter annular portion 16 of the cage 14 and its surrounding area. The sectional view shown in FIG. 2 is a drawing of a section including the centerline L shown in FIG. 1. In FIG. 2, the hatched portion of the cage 14 represents the large-diameter annular portion 16.

The large-diameter annular portion 16 has a tilted surface 31 and an outer cylinder surface 34 in its outer periphery. The tilted surface 31 is a surface whose diameter increases toward the other side in the axial direction. The tilted surface 31 has the opposing surface portion 32 that faces an inner peripheral surface 11a of the outer ring 11, and a non-opposing surface portion 33 that does not face the inner peripheral surface 11a of the outer ring 11. The opposing surface portion 32 is located on the one side in the axial direction with respect to an imaginary plane K1 extending along a side surface 81 on the other side in the axial direction of the outer ring 11, and faces the inner peripheral surface 11a of the outer ring 11. The non-opposing surface portion 33 is located on the other side in the axial direction with respect to the imaginary plane K1, and does not face the inner peripheral surface 11a of the outer ring 11. The opposing surface portion 32 and the non-opposing surface portion 33 are continuous with each other in the outer periphery of the large-diameter annular portion 16. In the section shown in FIG. 2, the non-opposing surface portion 33 is provided along the extension line of the opposing surface portion 32.

The outer cylinder surface 34 will be described. The outer cylinder surface 34 is a surface that is continuous with the non-opposing surface portion 33 via a bent portion 36. The outer cylinder surface 34 is a surface whose tilt angle with respect to the centerline L (see FIG. 1) is smaller than that of the tilted surface 31, or a surface along an imaginary cylindrical surface about the centerline L (see FIG. 1). Like the tilted surface 31, the outer cylinder surface 34 is a surface that is continuous in the circumferential direction.

Each bar 17 has the extended surface 35 that is continuous with the tilted surface 31 toward the other side in the axial direction. The extended surface 35 and the tilted surface 31 have the same tilt angle with respect to the centerline L (see FIG. 1). The tilted surface 31 is a surface that is continuous in the circumferential direction, but the extended surface 35 is a surface that is provided on both sides in the circumferential direction of a part of each bar 17 and is discontinuous in the circumferential direction. The opposing surface portion 32 and the extended surfaces 35 serve as the guide surface 29 that can contact the outer ring 11.

Figure 3:
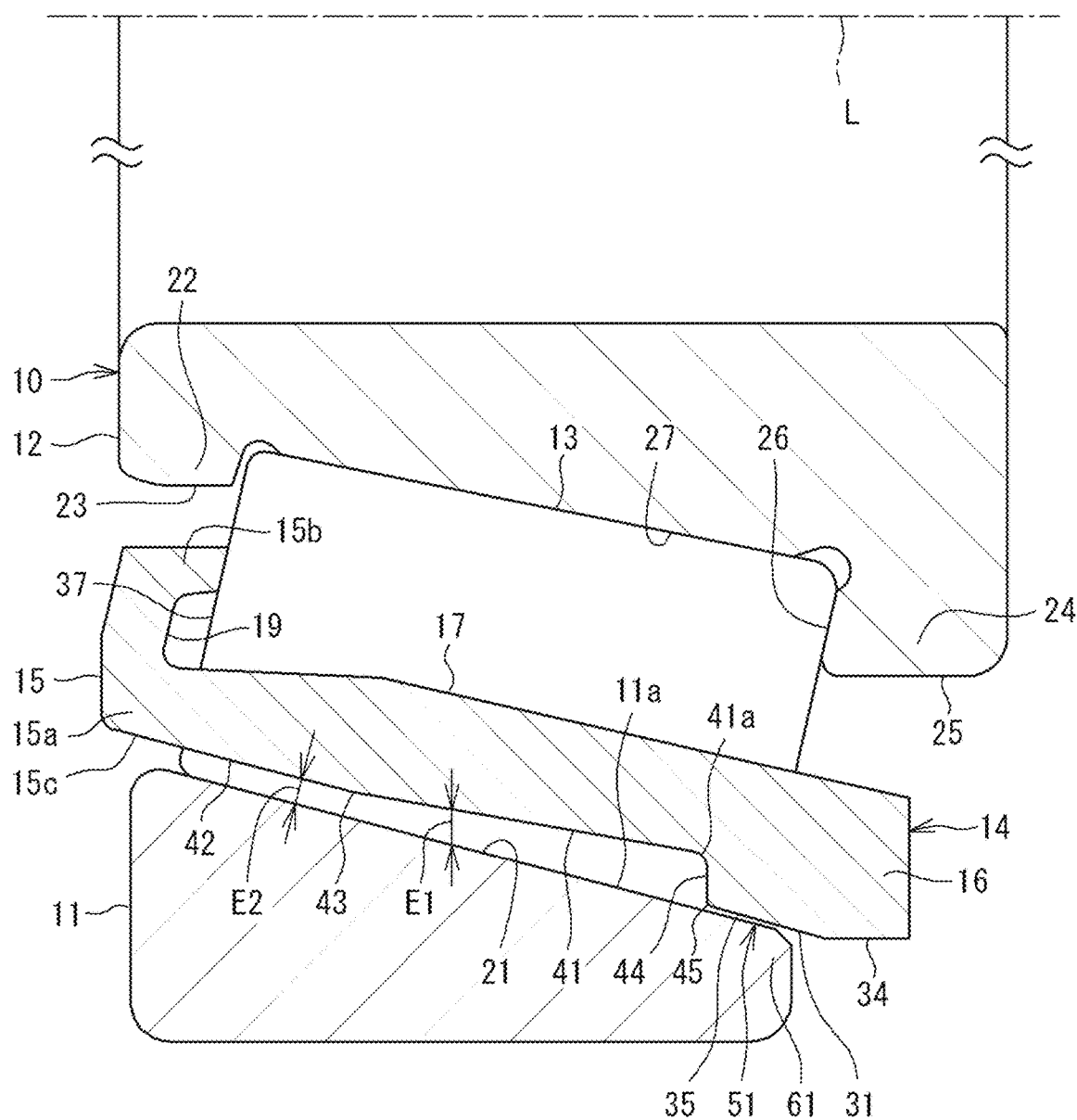
FIG. 3 is a sectional view taken along a plane passing through a bar of the cage.

FIG. 3 is a sectional view taken along a plane passing through the centerline L and the bar 17 of the cage 14. The bar 17 has a first outer surface 41 and a second outer surface 42 on its radially outer side. The first outer surface 41 is a surface having a shape extending along a first imaginary tapered surface whose diameter decreases toward the one side in the axial direction, and is a surface that increases the distance E1 to the inner peripheral surface 11a of the outer ring 11 toward the other side in the axial direction. The first outer surface 41 is provided on the one side in the axial direction with respect to the tilted surface 31 and the extended surface 35.

The second outer surface 42 has a shape extending along a second imaginary tapered surface whose diameter decreases toward the one side in the axial direction. The tilt angle of the second outer surface 42 with respect to the centerline L is the same as the tilt angle of the inner peripheral surface 11a of the outer ring 11 (outer ring raceway surface 21) with respect to the centerline L. In other words, the second outer surface 42 is a surface whose distance E2 to the inner peripheral surface 11a of the outer ring 11 is constant. The first outer surface 41 and the second outer surface 42 are continuous with each other via a bent portion 43. The second outer surface 42 is continuous with an outer peripheral surface 15c of the small-diameter annular portion 15. The tilt angle of the second outer surface 42 is the same as the tilt angle of the outer peripheral surface 15c of the small-diameter annular portion 15.

The bar 17 has a wall surface 44 extending from an end 41a on the other side in the axial direction of the first outer surface 41 toward the outer ring 11. As shown in FIGS. 3 and 4, the wall surface 44 is provided on the one side in the axial direction with respect to the large-diameter annular portion 16. The wall surface 44 is a surface facing the one side in the axial direction. The wall surface 44 is continuous with the extended surface 35 via a bent portion 45.

Figure 5:
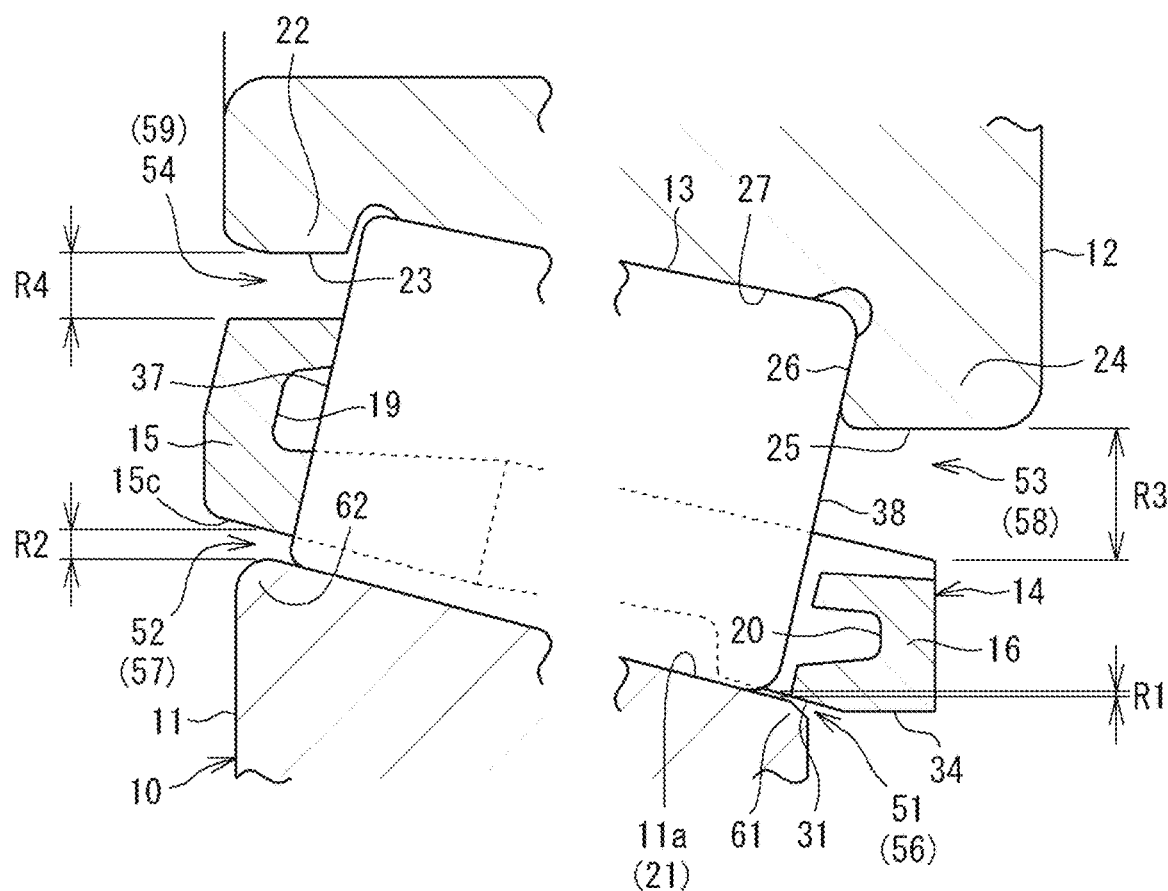
FIG. 5 is an enlarged sectional view showing a small-diameter annular portion of the cage and its surrounding area and the large-diameter annular portion of the cage and its surroundings area.

FIG. 5 is an enlarged sectional view showing the small-diameter annular portion 15 of the cage 14 and its surrounding area and the large-diameter annular portion 16 of the cage 14 and its surroundings area. The clearance formed between the large-diameter annular portion 16 and an end 61 on the other side in the axial direction of the outer ring 11 when in the reference state is defined as a "first clearance 51." The clearance formed between the small-diameter annular portion 15 and an end 62 on the one side in the axial direction of the outer ring 11 when in the reference state is defined as a "second clearance 52." The clearance formed between the large-diameter annular portion 16 and the large rib 24 of the inner ring 12 when in the reference state is defined as a "third clearance 53." The clearance formed between the small-diameter annular portion 15 and the small rib 22 of the inner ring 12 when in the reference state is defined as a "fourth clearance 54."

"R1" represents the radial dimension of the first clearance 51, and "R2" represents the radial dimension of the second clearance 52. "R3" represents the radial dimension of the third clearance 53, and "R4" represents the radial dimension of the fourth clearance 54. Each of the dimensions R1, R2, R3, and R4 is the dimension of the radially smallest part of the corresponding clearance.

The first clearance 51 is smaller than the second clearance 52. That is, the radial dimension R1 of the first clearance 51 is smaller than the radial dimension R2 of the second clearance 52 (R1<R2). In the section shown in FIG. 2, the inner peripheral surface 11*a* of the outer ring 11 and the tilted surface 31 of the large-diameter annular portion 16 are parallel to each other, and the space between the inner peripheral surface 11*a* and the tilted surface 31 is the first clearance 51, and the radial dimension of the first clearance 51 is R1.

In FIG. 5, each of the first clearance 51 and the second clearance 52 is formed continuously in the circumferential direction. Therefore, the first clearance 51 forms a first annular clearance 56 between the large-diameter annular portion 16 and the end 61 of the outer ring 11. The second clearance 52 forms a second annular clearance 57 between the small-diameter annular portion 15 and the end 62 of the outer ring 11. Although the first annular clearance 56 has an annular shape that is larger in the radial direction than the annular shape of the second annular clearance 57, the opening area of the first annular clearance 56 is smaller than the opening area of the second annular clearance 57.

The sum of the first clearance 51 and the third clearance 53 is larger than the sum of the second clearance 52 and the fourth clearance 54. In other words, the sum of the radial dimension R1 of the first clearance 51 and the radial dimension R3 of the third clearance 53 is larger than the sum of the radial dimension R2 of the second clearance 52 and the radial dimension R4 of the fourth clearance 54. (R1+R3>R2+R4).

Each of the third clearance 53 and the fourth clearance 54 is formed continuously in the circumferential direction. Therefore, the third clearance 53 forms a third annular clearance 58 between the large rib 24 of the inner ring 12 and the large-diameter annular portion 16. The fourth clearance 54 forms a fourth annular clearance 59 between the small rib 22 of the inner ring 12 and the small-diameter annular portion 15. The sum of the opening area A1 of the first annular clearance 56 and the opening area A3 of the third annular clearance 58 is larger than the sum of the opening area A2 of the second annular clearance 57 and the opening area A4 of the fourth annular clearance 59 (A1+A3>A2+A4).

[Tapered Roller Bearing 10 of Embodiment]

As described above, the tapered roller bearing 10 of the present embodiment (see FIG. 1) includes the outer ring 11, the inner ring 12, the plurality of tapered rollers 13, and the annular cage 14 that holds the plurality of tapered rollers 13. The cage 14 includes the small-diameter annular portion 15 located on the one side in the axial direction of the tapered rollers 13, the large-diameter annular portion 16 located on the other side in the axial direction of the tapered rollers 13, and the plurality of bars 17 connecting the small-diameter annular portion 15 and the large-diameter annular portion 16. The recess 20 that is open toward the large end faces 38 of the tapered rollers 13 is provided in the large-diameter annular portion 16. The inner ring 12 has, on the other side in the axial direction, the large rib 24 that slidingly contacts the large end faces 38 of the tapered rollers 13.

As described above with reference to FIG. 5, the first clearance 51 between the large-diameter annular portion 16 and the outer ring 11 is smaller than the second clearance 52 between the small-diameter annular portion 15 and the outer ring 11. As shown in FIG. 2, the large-diameter annular portion 16 has, in its outer periphery, the tilted surface 31 whose diameter increases toward the other side in the axial direction. The tilted surface 31 has the opposing surface portion 32. The opposing surface portion 32 is located on the one side in the axial direction with respect to the imaginary plane K1 extending along the side surface 81 on the other side in the axial direction of the outer ring 11, and faces the inner peripheral surface 11*a* of the outer ring 11.

According to the tapered roller bearing 10 having the above configuration, the first clearance 51 between the outer ring 11 and the large-diameter annular portion 16 is small. The large-diameter annular portion 16 has the tilted surface 31 whose diameter increases toward the other side in the axial direction like the outer ring raceway surface 21, and the tilted surface 31 has the opposing surface portion 32 that faces the outer ring 11. Therefore, lubricating oil is less likely to flow out from between the inner peripheral surface 11*a* of the outer ring 11 and the opposing surface portion 32 of the large-diameter annular portion 16.

The lubricating oil is stored in the recess 20 of the large-diameter annular portion 16. Since the first clearance 51 is small, the outer peripheral surface of the large-diameter annular portion 16 is located close to the outer ring 11. Therefore, the large-diameter annular portion 16 is increased in size in the radial direction, so that the capacity of the recess 20 can be increased. Lubricating oil inside the bearing between the outer ring 11 and the inner ring 12 where the tapered rollers 13 are located is less likely to flow out from the other side in the axial direction, and more lubricating oil can be stored in the recess 20 of the large-diameter annular portion 16. Since the recess 20 faces the large end faces 38 of the tapered rollers 13, the lubricating oil in the recess 20 is supplied to the large end faces 38. The lubricating oil supplied to the large end faces 38 is supplied between the large end faces 38 and the large rib 24 of the inner ring 12 as the tapered rollers 13 rotate.

As described above, in the tapered roller bearing 10, the lubricating oil on the other side in the axial direction is easily supplied between the large rib 24 of the inner ring 12 and the large end faces 38 of the tapered rollers 13, which can improve the function to prevent seizure therebetween.

As described above, when the tapered roller bearing 10 rotates, lubricating oil flows from the one side in the axial direction to the other side in the axial direction. Therefore, in the tapered roller bearing 10 of the present embodiment, the first clearance 51 is smaller than the second clearance 52, but the sum of the first clearance 51 and the third clearance 53 is larger than the sum of the second clearance 52 and the fourth clearance 54. In other words, according to this tapered roller bearing 10, the clearance on the downstream side in the flow direction of the lubricating oil is larger than the clearance on the upstream side. Therefore, when the bearing is rotating, the lubricating oil is less likely to stagnate inside the bearing, so that stirring resistance of the lubricating oil caused by the rotating cage 14 can be reduced.

In the tapered roller bearing 10 of the present embodiment (see FIG. 3), each bar 17 of the cage 14 has the first outer surface 41 on its radially outer side. The first outer surface 41 increases the distance E1 to the inner peripheral surface 11a of the outer ring 11 toward the other side in the axial direction. With this configuration, when the centerline L of the rolling bearing 10 is horizontal, a larger space for storing lubricating oil can be secured between the bars 17 and the outer ring 11 on the bottom side of the rolling bearing 10 when the bearing is stopped. In particular, since the first clearance 51 is small as described above, lubricating oil is less likely to flow out of the bearing, and a large amount of lubricating oil is stored between the first outer surfaces 41 of the bars 17 and the inner peripheral surface 11a of the outer ring 11. When the bearing starts rotating, the lubricating oil in that space can be used for lubrication.

Moreover, each bar 17 has the wall surface 44 extending from the end on the other side in the axial direction of the first outer surface 41 toward the outer ring 11. The wall surface 44 is provided on the one side in the axial direction with respect to the large-diameter annular portion 16. With this configuration, when the bearing rotates, lubricating oil flowing toward the other side in the axial direction along the first outer surface 41 of the cage 14 hits the wall surface 44. In FIG. 4, the flow of the lubricating oil along the first outer surface 41 is shown by an arrow Y. The wall surface 44 changes the flow direction of the lubricating oil to the circumferential direction (direction of arrows X), so that the lubricating oil is easily supplied to the pockets 18 holding the tapered rollers 13 and the large end faces 38 of the tapered rollers 13.

As described above, it is possible to improve the lubrication performance of the tapered roller bearing 10.

Others

The above embodiment is illustrative in all respects and not restrictive. The scope of the present invention is shown by the claims rather than by the above embodiment, and is intended to include all modifications within the scope equivalent to that of the configurations described in the claims.

DESCRIPTION OF THE REFERENCE NUMERALS

10 . . . tapered roller bearing, 11 . . . outer ring, 11a . . . inner peripheral surface, 12 . . . inner ring, 13 . . . tapered roller, 14 . . . cage, 15 . . . small-diameter annular portion, 16 . . . large-diameter annular portion, 17 . . . bar, 20 . . . recess (second recess), 21 . . . outer ring raceway surface, 22 . . . small rib, 24 . . . large rib, 27 . . . inner ring raceway surface, 31 . . . tilted surface, 32 . . . opposing surface portion, 38 . . . large end face, 41 . . . outer surface, 41a . . . end, 44 . . . wall surface, 51 . . . first clearance, 52 . . . second clearance, 53 . . . third clearance, 54 . . . fourth clearance, 81 . . . side surface, K1 . . . imaginary plane

The invention claimed is:

1. A tapered roller bearing comprising:
an outer ring including an outer ring raceway surface whose diameter increases from one side in an axial direction toward another side in the axial direction;
an inner ring including an inner ring raceway surface whose diameter increases from the one side in the axial direction toward the other side in the axial direction;
a plurality of tapered rollers each including a large end face on the other side in the axial direction; and
an annular cage that holds the plurality of tapered rollers, wherein
the cage includes
a small-diameter annular portion located on the one side in the axial direction of the tapered rollers,
a large-diameter annular portion located on the other side in the axial direction of the tapered rollers, and
a plurality of bars connecting the small-diameter annular portion and the large-diameter annular portion,
the inner ring includes a large rib that slidingly contacts the large end face,
a recess that is open toward the large end face is provided in the large-diameter annular portion,
a first clearance between the large-diameter annular portion and the outer ring is smaller than a second clearance between the small-diameter annular portion and the outer ring,
the large-diameter annular portion includes, in an outer periphery of the large-diameter annular portion, a tilted surface whose diameter increases toward the other side in the axial direction,
the tilted surface includes an opposing surface portion that is located on the one side in the axial direction with respect to an imaginary plane extending along a side surface on the other side in the axial direction of the outer ring, and that faces an inner peripheral surface of the outer ring,
the bar includes, on a radially outer side of the bar,
a first outer surface that increases a distance to the inner peripheral surface of the outer ring toward the other side in the axial direction,
a second outer surface that is continuous with the first outer surface and continuous with an outer peripheral surface of the small-diameter annular portion, and
a wall surface extending from an end on the other side in the axial direction of the first outer surface toward the outer ring,
the bar includes, on the radially outer side of the bar,
an extended surface that is continuous with the wall surface via a bent portion and continuous with the tilted surface of the large-diameter annular portion without via a bent portion, and
a distance from the extended surface of the bar and the tilted surface of the large-diameter annular portion to the inner peripheral surface of the outer ring is smaller than a distance from the second outer surface to the inner peripheral surface of the outer ring.

2. The tapered roller bearing according to claim 1, wherein a sum of the first clearance and a third clearance is larger than a sum of the second clearance and a fourth clearance, the third clearance being a clearance between the large-diameter annular portion and an outer peripheral surface of the large rib, and the fourth clearance being a clearance between the small-diameter annular portion and the inner ring.

3. The tapered roller bearing according to claim 1, wherein the wall surface is provided on the one side in the axial direction with respect to the large-diameter annular portion.

4. The tapered roller bearing according to claim 1, wherein the tilted surface of the large-diameter annular portion includes the opposing surface portion that faces the inner peripheral surface of the outer ring, and a non-opposing surface portion that does not face the inner peripheral surface of the outer ring.

* * * * *